United States Patent [19]
Piemont

[11] 3,815,647
[45] June 11, 1974

[54] WOOD WORKING MACHINE

[76] Inventor: Emile Georges Piemont, 2, rue Rabelais, 92 Vanves, France

[22] Filed: Oct. 10, 1972

[21] Appl. No.: 295,883

[52] U.S. Cl. .................. 144/1 C, 144/1 G, 144/36, 144/39
[51] Int. Cl. ............................................ B27c 9/04
[58] Field of Search ............ 144/1 R, 1 B, 1 C, 1 G, 144/1 N, 35, 36, 37, 39

[56] References Cited
UNITED STATES PATENTS

| | | | |
|---|---|---|---|
| 1,973,409 | 9/1934 | Evinrude | 144/1 D |
| 2,571,861 | 10/1951 | Gegumis | 144/36 |
| 3,011,533 | 12/1961 | Newman, Sr. | 144/35 R |
| 3,368,596 | 2/1968 | Comer | 144/39 X |

Primary Examiner—Andrew R. Juhasz
Assistant Examiner—W. D. Bray
Attorney, Agent, or Firm—Linton & Linton

[57] ABSTRACT

Combined wood-working machine, characterized in that the distance separating a tool-holding shaft and a tool-holding motor shaft is variable and the table of a smoothing planer supports the motor and can pivot around an axis which has a fixed height relative to the ground, the table of a saw and the table of a rough planer, form the two opposite and parallel faces of a prismatic block being displaceable in a direction perpendicular to the table of the smoothing planer.

8 Claims, 7 Drawing Figures

PATENTED JUN 11 1974 3,815,647

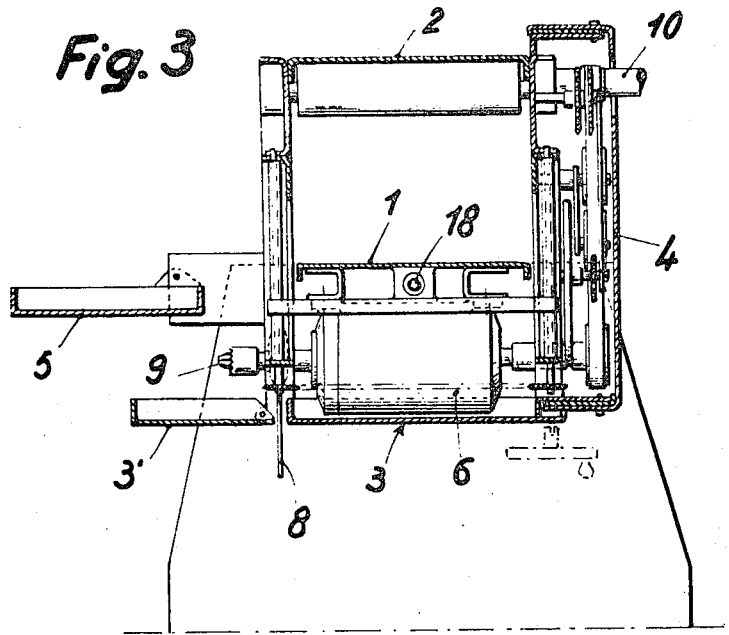
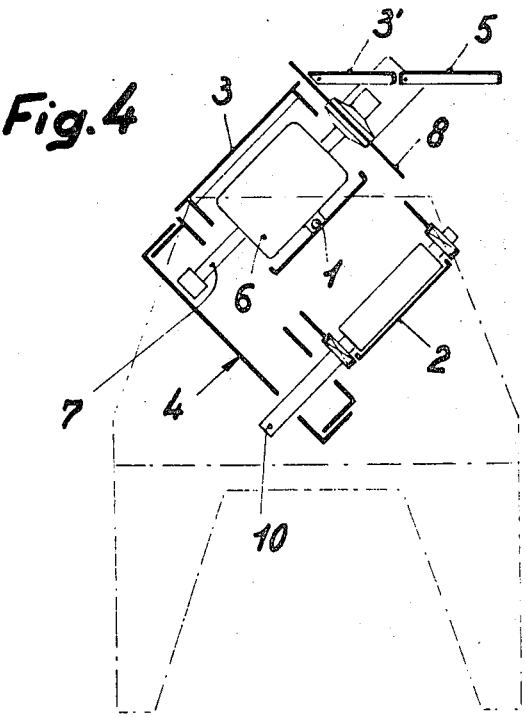

WOOD WORKING MACHINE

The present invention relates to a combined woodworking machine of the type which permits sawing, surfacing (rough-planing), smooth planing, mortising and shaping (spinning).

BACKGROUND OF THE INVENTION

Such machines are known from German Pat. No. 1,166,448, which comprises a rotary machining block that permits bringing the selected tool and its table into working position, said block being pivotable between the arms of a U-shaped chassis. In this machine the planer-surfacer (rough-planer) is constructed in classic fashion, that is to say that the table of the surfacer is fixed relative to the ground in working position, while the planing table is mobile inside the block.

This arrangement makes for a complicated and troublesome structure of the rotary block, and limits the length of the planing table. As a matter of fact, since this table is mobile relative to the ground, its length must be less than the distance separating the bearings supporting the rotary block because, in this machine, the axis of rotation of the block extends perpendicularly to the tool-holding shafts.

French Pat. No. 1,594,086 dated May 12, 1968, filed in the name of the applicant, discloses a machine of this type which comprises a tool block that can pivot inside a frame to bring the tools into position relative to a single work table, in order to permit surfacing, sawing or shaping (spinning), the placing and adjusting of the tools being done by a rotation followed by a translation of the block. This device, for each phase of the machining, required the dismounting of guides and guards and the dis-adjustment of the tools previously used. Furthermore, the planing is obtained with the aid of a removable table, fixed relative to the ground.

The present invention, which remedies these drawbacks, is remarkable in that the table of the smoothing planer solidly supports the motor, and can pivot around a horizontal axis, fixed in height relative to the ground. The table for the saw and the one for the rough planer extend parallel to, and on either side of, the table of the smoothing planer in order to form a prismatic block, mobile in a direction perpendicular to the latter, and supporting, on the one side, the table of the shaper, which extends parallel to the axis of rotation of the block, and on the other, the table of the mortiser.

The present invention will be understood better with the aid of the description which follows, made in reference to the drawings attached by way of indicative example only, in which:

FIG. 3 is a sectional view taken along the line III—III in FIG. 2.

FIG. 4 is a view analogous to FIG. 1, showing how an oblique saw cut can be made.

Figure 1:
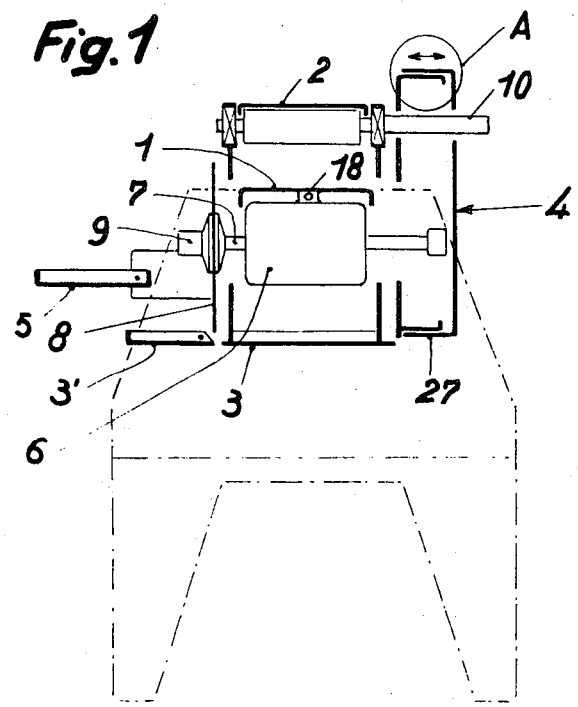
FIG. 1 is a diagrammatic view in vertical section showing the operating principle of the machine which is the object of the present invention.

Referring to the drawings, 1 designates the table of the smoothing planer, 2 that of the rough planer, 3 that of the saw, 4 that of the shaper and 5 that of the mortiser.

Table 1, having a fixed height relative to the ground, supports motor 6 whereof the ends of shaft 7 constitute, respectively, the support of circular saw 8 and that of mandrel 9 of the mortising tool.

Figure 2:
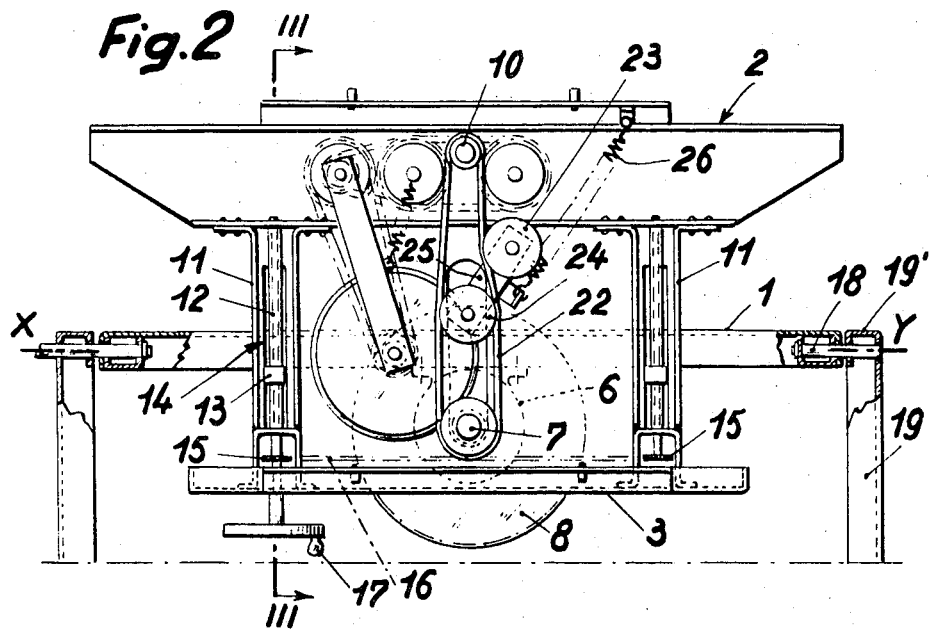
FIG. 2 is, on a larger scale, a right hand view of FIG. 1 with the shaping table being removed.

Assembly 1–6 can pivot around a horizontal axis X-Y, see FIG. 2, extending perpendicular to the axis of motor 6.

Tables 2, 3, 4 and 5 form a rectangular and one piece whole unit which can be displaced in a direction perpendicular to table 1. The whole comprising the five tables constitutes a rotary block.

In contrast to classic machines, the adjustment of the rough planer is made by displacing table 2 relative to table 1, this displacement also making it possible to adjust either the saw with respect to table 3, or the mortising tool with respect to table 5.

The dressing and planning tool (not shown) is borne by a shaft 10 disposed under table 2, and linked in translation to the latter with one end of said shaft supporting the spinning iron.

According to another characteristic of the invention, table 4 of the shaper, which is perpendicular to shaft 10, can be displaced in a direction parallel to the latter, and constitutes, in addition, the protective housing for the transmission mechanism.

Finally, table 5 can be inclined relative to table 3, in order to be placed in the extension of the mobile part 3' of the latter according to FIG. 4.

Tables 2 and 3 are connected by four columns 11, each with a screw 12 immobilized in translation. Under table 1 there are two crosspieces 13 in the threaded ends of which are engaged the screws 12 with the guidance of said crosspieces being insured by openings 14 provided in columns 11. Pinions 15 mounted on screws 12 and linked by a chain 16 make it possible to displace tables 2-3-5 parallel to table 1 with the maneuver optionally being controlled by a handwheel 17, for example.

Figure 7:
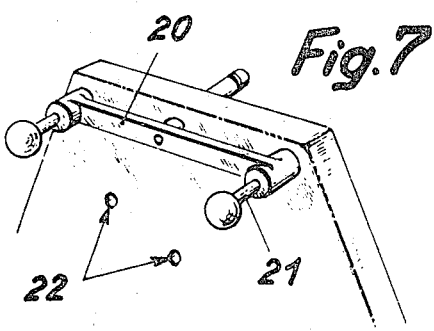
FIG. 7 is a partial perspective view showing the member for operating and locking the rotary block.

Table 1, at each end, has a median journal 18 resting in a bearing in frame 19. one of these journals can be made integral with an operating lever 20 which has, at one end, at least one locking device 21 of a known type, with retractable finger, and holes 22 being provided on the corresponding face of the frame making it possible to position the pivoting block (FIG. 7).

Table 1 is level with the top 19' of the frame, which makes it possible to fix a removable table, not shown, against the latter, which can lengthen the supporting face of the planer.

The distance separating axes 7 and 10 is variable and therefore transmission belt 22 is provided with an automatic tensioning device constituted by two idler pulleys 23 and 24. Pulley 23 is disposed outside belt 22, while pulley 24 is situated inside, and pulley 24 is fixed to the end of a lever 25 articulated along the axis of pulley 23 and subjected to the action of a spring 26 which tends to pivot it in order to wind the said belt around pulley 23. (FIG. 2).

All the transmission members are enclosed in a housing 27, whose faces constitute the table 4.

Figure 5:
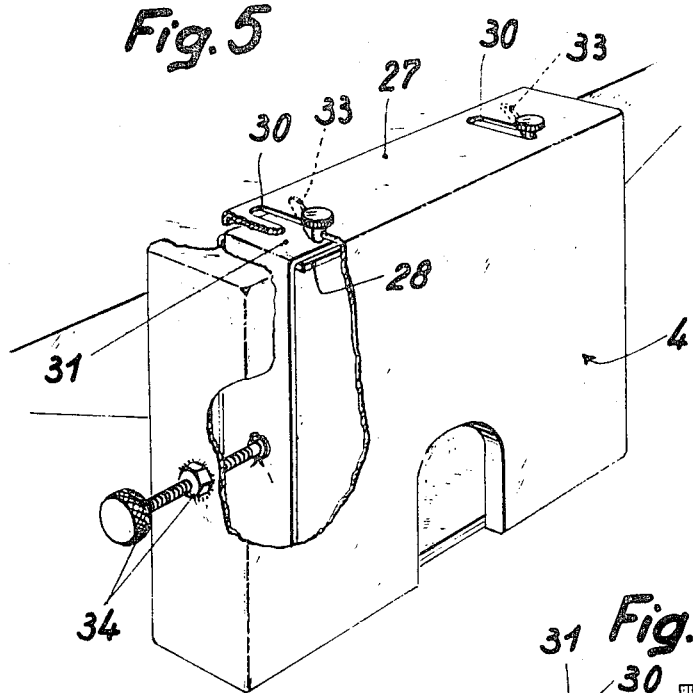
FIG. 5 is a partial perspective view showing how the shaping table is controlled.
Figure 6:
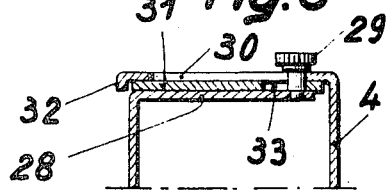
FIG. 6 is a sectional view on a larger scale of detail A in FIG. 1.

Housing 27 is mounted on two parallel wings 28 extending parallel to tables 2 and 3, each of said wings having a finger 29 passing through opening 30 in the corresponding edge of the housing, and extending perpendicular to table 4 (FIGS. 5 and 6).

The displacement of table 4 is insured by a bracket (stirrup), each arm 31 of which is inserted between wing 28 and the corresponding inner face of the housing. Each arm 31 of the bracket which is guided between the inner face of table 4 and a flange 32 on the housing, has two openings 33, oblique and parallel, each one traversed by the corresponding finger 29.

As the bracket is made to slide in the slideway formed by two opposite sides of the housing, with the aid of a screw and nut system, for example, the displacement of table 4 is produced in a direction parallel to shaft 10, which makes it possible to adjust the height of the shaper iron relative to said table 4.

What I claim is:

1. A wood-working machine comprising, in combination, a saw, a mortising tool having a mandrel, a rotary block whose lateral faces constitute work tables, an electric motor carried by said rotary block and supporting said saw and the mandrel of said mortising tool, a tool-holding shaft carried by said rotary block and extending parallel to the shaft of said motor, and means for displaceing said tool-holding shaft parallel to the shaft of said motor.

2. A wood-working machine comprising, in combination, a saw, a rough planer, a smoothing planer, a pivoting planer table for said smoothing planer having a pivoting axis of a fixed height relative to the ground, a rotary block including said planer table, having one face which constitutes the table of said saw while a face thereof opposite and parallel to the first face of said rotary block constitutes the table of said rough planer, an electric motor carried by said pivoting and planer table and operatively connected to said saw, said rough planer and said smoothing planer, a frame means supporting said pivoting axis of said smoothing planer on said frame and permitting the pivoting of said smoothing planer table along an axis perpendicular to that of said motor, and means for displacing said saw and rough planer tables of said rotary block in a direction perpendicular to the table of said smoothing planer.

3. A wood-working machine comprising, in combination, a rough planer, a smoothing planer, a table for said smoothing planer, a table for said rough planer, a frame pivotally supporting the table of said smoothing planer, an electric motor mounted under the table of said smoothing planer, means for permitting the pivoting of said smoothing planer table along an axis having a fixed height relative to the ground, and dispersed perpendicularly to the shaft of said motor, a rotary block supported by the table of said smoothing planer, a tool holder, a shaft for said tool holder positioned inside said block, means for displacing said block relative to the table of said smoothing planer in such a way as to displace the axis of said tool-holder parallel to the shaft to said motor, said rough planer table being mounted on a first face of said block, a saw, a table for said saw provided on an opposite face of said block, said saw table being parallel to the shaft of said motor and to the table on said rough planer, a shaper spinner, a table for said shaper spinner provided on a third face of said block disposed perpendicular to said first two tables of said block, means for displacing said table of said shaper spinner in a direction parallel to the shaft of said motor, a mortiser, a mortiser table provided on the face of said block opposite that comprising the table of said shaper, said mortiser table being disposed parallel to the shaft of said motor and transmission means operatively connecting said motor to said planer, said tool holder, said saw, said shaper spinner, and said mortiser.

4. A wood-working machine according to claim 3, in which said tool-holding shaft is fixed to the table of said rough planer and disposed under the latter.

5. A wood-working machine according to claim 3 in which the mobile table of said shaper is constituted by the face of a protective housing for said transmittion means.

6. A wood-working machine according to claim 3 in which the table of said mortiser is inclinable and can pivot around an axis parallel to the pivoting axis of the mobile part of said saw table in order to be placed in inclined position the extension of said mobile part of said saw table.

7. A wood-working machine according to claim 3 wherein said transmission means includes a transmission belt connecting said motor to said tool-holding shaft, two idler pulleys are disposed on either side of one strand of said belt, the axis of the inner one of said pulleys is fixed, a lever with the one of said pulleys connected thereto, is pivoted on the axis of the inner pulley, a spring tends to pivot said lever and wind said strand around said outer pulley.

8. A wood-working machine according to claim 3 in which the mobile table of said shaper is constituted by the face of a protection housing of said transmission means, said protective housing has wings, two of the opposing sides of said housing are slideable on said wings on said block, two fingers on said wings pass through guide openings on said sides of said housing and extend perpendicular to said shaper table, brackets, each of whose arms are provided with oblique openings parallel to one another and likewise are transversed by said guide fingers, extend between one of said wings on said block and the inner face of said housing to constitute a slideway to guide the corresponding arm of said bracket and the displacement of said table in a direction parallel to the shaft of said motor.

* * * * *

UNITED STATES PATENT OFFICE
CERTIFICATE OF CORRECTION

Patent No. 3,815,647　　　　　　　　　Dated June 11, 1974

Inventor(s)　　Emile Georges Piemont

It is certified that error appears in the above-identified patent and that said Letters Patent are hereby corrected as shown below:

On the cover sheet insert:

-- [30] Foreign Application Priority Data

France　　　　71 36202　　　Oct. 8, 1971　　　--.

Signed and sealed this 24th day of December 1974.

(SEAL)
Attest:

McCOY M. GIBSON JR.　　　　　　　　C. MARSHALL DANN
Attesting Officer　　　　　　　　　Commissioner of Patents